United States Patent [19]

Morotomi et al.

[11] Patent Number: 4,502,077
[45] Date of Patent: Feb. 26, 1985

[54] GHOST CANCELING APPARATUS

[75] Inventors: Noriaki Morotomi, Neyagawa; Takeshi Sato, Hirakata, both of Japan

[73] Assignee: Matsushita Electric Industrial Co., Ltd., Osaka, Japan

[21] Appl. No.: 316,423

[22] Filed: Oct. 29, 1981

[30] Foreign Application Priority Data

Oct. 29, 1980 [JP] Japan .................. 55-152917

[51] Int. Cl.³ .................. H04N 5/21; H04B 3/04
[52] U.S. Cl. .................. 358/167; 358/36; 358/905
[58] Field of Search .................. 358/36, 37, 166, 167, 358/905, 21 R

[56] References Cited

U.S. PATENT DOCUMENTS 3,320,361 5/1967 Stroh .................. 358/166
4,303,895 12/1981 Ohnishi .................. 358/905
4,389,623 6/1983 Onishi .................. 358/905

OTHER PUBLICATIONS

Ciciora, "A Tutorial on Ghost Cancelling in Television Systems", *IEEE Transactions on Consumer Electronics*, vol. CE-25, Feb. 1979, pp. 9-43.
Murakami et al., "A Digitalized Automatic Ghost Canceller", *IEEE Transactions on Consumer Electronics*, vol. CE-25, Aug. 1979, pp. 555-561.

*Primary Examiner*—Tommy P. Chin
*Attorney, Agent, or Firm*—Wenderoth, Lind & Ponack

[57] ABSTRACT

A ghost canceling apparatus for effectively canceling ghosts in television signals and having a high capability for canceling ghosts in the frequency band in which the ghost canceling is required. The apparatus utilizes an error detector and a tap gain control in a closed loop to control the gain of a transversal filter. In addition, a frequency transfer characteristic modifier is utilized to modify the loop frequency transfer characteristics so as to optimize the cancelation of ghosts.

7 Claims, 14 Drawing Figures

GHOST CANCELING APPARATUS

BACKGROUND OF THE INVENTION

The present invention relates to a ghost canceling apparatus used in a satellite station, a head-end demodulator section of a CATV system, and a consumer television set, particularly to a ghost canceling apparatus using a transversal filter, an input signal of the ghost canceling apparatus being either modulated or a demodulated television signal.

Lately, the ghost canceling apparatus using a transversal filter has become considered to be useful for canceling ghosts. The principle of this ghost canceling apparatus is that the ghost canceling apparatus generates the reverse transfer function to the propagation path which is including a ghost. The ghost canceling apparatus using a transversal filter is described by W. Ciciora, "A Tutorial on Ghost Cancelling in Television Systems", IEEE Trans. on Consumer Electronics, Vol CE-25, February 1979, and by J. Murakami, "A Digitalized Automatic Ghost Canceller", IEEE Trans. on Consumer Electronics, Vol CE-25, August 1979.

As the algorithm for controlling tap gains of the transversal filter, the Zero-Forcing algorithm and the Mean Square Error algorithm is usually used, and as the reference signal for canceling the ghost, a differentiated vertical pulse is usually used.

The ghost canceling apparatus using the transversal filter, the abovesaid algorithm, and the abovesaid reference signal can't completely cancel a higher frequency component of the ghost, especially a color ghost.

SUMMARY OF THE INVENTION

It is an object of the present invention to provide a ghost canceling apparatus which cancels a ghost effectively and has a high capability of canceling a ghost in the frequency band in which a ghost canceling is required.

It is another object of the present invention to provide a ghost canceling apparatus which has a capability of canceling a color ghost.

It is a further object of the present invention to provide a capability of canceling a ghost by keeping a reference signal used for controlling a transversal filter from a noise of another frequency component and from a quantizing noise of A/D conversion.

These and other objects of the present invention can be achieved by a ghost canceling apparatus for canceling a ghost component in a video signal, the apparatus comprising (a) a ghost component transferring path which transfers a signal including a ghost component signal and comprises: an input terminal to which a video signal is inputted; a transversal filter operatively coupled at an input terminal thereof to said input terminal of said ghost component transferring path for canceling said ghost component signal; an error detecting means operatively coupled at an input terminal thereof to an output terminal of said transversal filter for detecting a ghost canceling error signal from said video signal; and a tap gain control means operatively coupled at an input terminal thereof to an output terminal of said error detecting means for generating a tap gain control signal to said transversal filter from said ghost canceling error signal, (b) a control signal path for supplying said control signal from said tap gain control means to a tap gain control terminal of said transversal filter, said transversal filter canceling a ghost under the control of said tap gain control signal, and (c) an outputting path for supplying an output signal of said transversal filter to an output terminal of said ghost canceling apparatus, wherein said ghost canceling apparatus further comprises a frequency transfer characteristic modification means provided in said ghost component transferring path for modifying said signal which is transferred through said ghost component transferring path.

Furthermore, the objects of the present invention can be achieved by a ghost canceling apparatus which is mainly the same as the abovesaid ghost canceling apparatus but further comprising an input path branch for feeding the input video signal to a further input terminal of said tap gain control means for generating said tap gain control signal from both said input video signal and said ghost canceling error signal.

BRIEF DESCRIPTION OF THE DRAWINGS

Hereinafter, the present invention will be detailed with the accompanying drawings in which.

DESCRIPTION OF THE PREFERRED EMBODIMENTS

Figure 1:
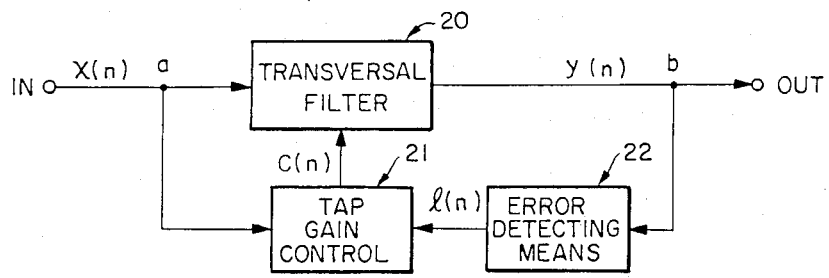
FIG. 1 is a block diagram of a conventional ghost canceling apparatus.

FIG. 1 is a block diagram of a conventional ghost cancelling apparatus. Referring first to the conventional ghost canceling apparatus in FIG. 1, this ghost canceling apparatus comprises a transversal filter 20, a tap gain control means 21, an error detecting means 22, a branch point (a), and a further branch point (b). In the drawings throughout this specification, a timing means is omitted for simplification, and signals are described in the discrete system.

An input signal x(n) of the conventional ghost canceling apparatus is convoluted with a tap gain c(j) which is given by the tap gain control means 21, at the transversal filter 20. The filter output signal y(n) is expressed as:

$$y(n) = \sum_j c(j) \cdot x(n-j) \tag{1}$$

During the occurrence of the filter output signal y(n) which contains a reference signal r(n) of the ghost canceling apparatus, the error detecting means 22 generates an error signal e(n) from y(n). Usually, the reference signal is a differentiated vertical pulse. The tap gain control means 21 renews the tap gain c(j), according to an algorithm for controlling the tap gains. Typical algorithms used as this algorithm are the Zero-Forcing algorithm (referred to as ZF, hereafter), and the Mean Square Error algorithm (referred to as MSE, hereafter).

Now if $c^{(m)}(j)$ is an m times renewed tap gain, $c^{(m)}(j)$ is, $$ZF: c_{ZF}^{(m)}(j) = c_{ZF}^{(m-1)}(j) - \alpha \cdot e^{(m-1)}(j) \quad (2)$$

$$MSE: c_{MSE}^{(m)}(j) = c_{MSE}^{(m-1)}(j) - \alpha \cdot \sum_n e^{(m-1)}(n) \cdot x(n-j) \quad (3)$$

where, $\alpha$ = constant.

Figure 2:
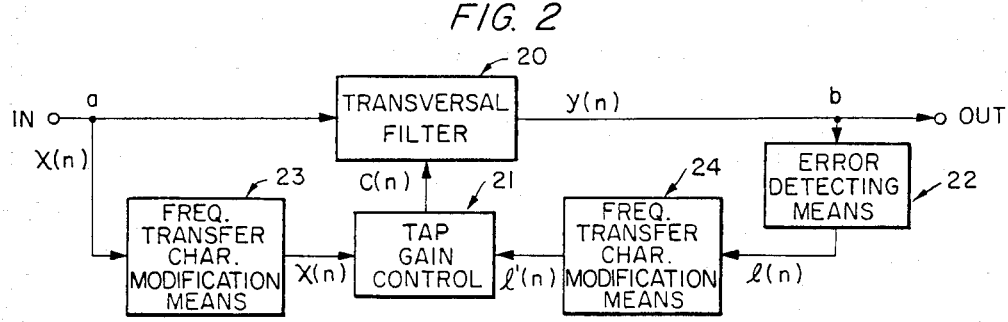
FIG. 2 is a block diagram of a ghost canceling apparatus embodying the present invention.

FIG. 2 shows a block diagram of a ghost canceling apparatus in a preferred embodiment of the present invention. This ghost canceling apparatus comprises the transversal filter 20, the tap gain control means 21, the error detecting means 22, frequency transfer characteristic modification means 23 and 24 the branch point (a), and the branch point (b). The frequency transfer characteristic modification means 23 and 24 modify the frequency transfer characteristic of x(n) and of e(n), respectively, in the frequency band in which a ghost is required to be canceled.

Hereinafter, the frequency transfer characteristic modification will be described, which modification improves the effect for canceling ghost. The error signal e(n) is a difference between the reference signal r(n) and the filter output signal y(n).

$$e(n) = y(n) - r(n) \quad (4)$$

From the equations (1) and (4), $$e(n) = \sum_j c(j) \cdot x(n-j) - r(n) \quad (5)$$

The Fourier transform of the equation (5)

$$E(l) = C(l) \cdot X(l) - R(l) \quad (6)$$

where $$X(l) = \sum_n x(n) \cdot \exp(-j2\pi l n) \quad (7)$$

$$E(l) = \sum_n e(n) \cdot \exp(-j2\pi l n) \quad (8)$$

$$R(l) = \sum_n r(n) \cdot \exp(-j2\pi l n) \quad (9)$$

$$C(l) = \sum_j c(j) \cdot \exp(-j2\pi l j) \quad (10)$$

If the television signal is demodulated by an ideal synchronous detector, the ghost condition is considered a filter {G(l)}. During the occurrence of the input signal x(n) which contains the reference signal with the ghost, X(l) is, $$X(l) = R(l) \cdot \{1 + G(l)\} \quad (11)$$

Thus, the equation (6) is rewritten as follows:

$$E(l) = R(l) \cdot [C(l) \cdot \{1 + G(l)\} - 1] \quad (12)$$

On the other hand, the Fourier transforms of the equation (2) and (3) are:

$$C_{ZF}^{(m)}(l) = C^{(m-1)}(l) - \alpha \cdot E^{(m-1)}(l) \quad (13)$$

$$C_{MSE}^{(m)}(l) = C_{MSE}^{(m-1)}(l) - \alpha \cdot E^{(m-1)}(l) \cdot X^*(l) \quad (14)$$

Inserting the equation (12) into the equation (13), $$C_{ZF}^{(m)}(l) = C_{ZF}^{(m-1)}(l) - \alpha \cdot R(l) \cdot [C_{ZF}^{(m-1)}(l) \cdot \{1 + G(l)\} - 1] \quad (15)$$

$$= 1/\{1 + G(l)\} + C_{ZF}^{(0)}(l) \cdot [1 - \alpha \cdot E(l) \cdot \{1 + G(l)\}]^m \cdot G(l)/\{1 + G(l)\}$$

If the initial condition of the transversal filter 20 is "through", $$C_{ZF}^{(0)}(l) = 1 \quad (16)$$

then $$C_{ZF}^{(m)}(l) = 1/\{1 + G(l)\} + [1 - \alpha \cdot R(l) \cdot \{1 + G(l)\}]^m \cdot G(l)/\{1 + G(l)\} \quad (17)$$

If the ghost is completely cancelled, C(l) becomes (from the equation (12)), $$C(l) = 1/\{1 + G(l)\} \quad (18)$$

Therefore, the second term of the equation (17) gives an error of the cancelling ghost.

In the same way, the Fourier transform of the equation (3) is, $$C_{MSE}^{(m)}(l) = 1/\{1 + G(l)\} + [1 - \alpha \cdot |R(l)|^2 \cdot |1 + G(l)|^2]^m \cdot G(l)/\{1 + G(l)\} \quad (19)$$

In the equation (19), the second term gives an error of the cancelling ghost.

Suppose that:

$$\beta_{ZF}(l) = 1 - \alpha \cdot R(l) \cdot \{1 + G(l)\} \text{ in the equation (17);}$$

and $\beta_{MSE}(l) = 1 - \alpha \cdot |R(l)|^2 \cdot |1 + G(l)|^2$ in the equation (19), the convergency conditions can be expressed as $|\beta_{ZE}(l)| < 1$, and $|\beta_{MSE}(l)| < 1$, respectively. However, the frequency range of the reference signal R(l) is limited. As the $|\beta_{ZF}(l)|$ and $|\beta_{MSE}(l)|$ becomes nearer to 1, the converging speed of the equation (17) and the equation (19) becomes slower. In other words, the rate of the ghost cancelling in each frequency area is different.

Figure 3A:
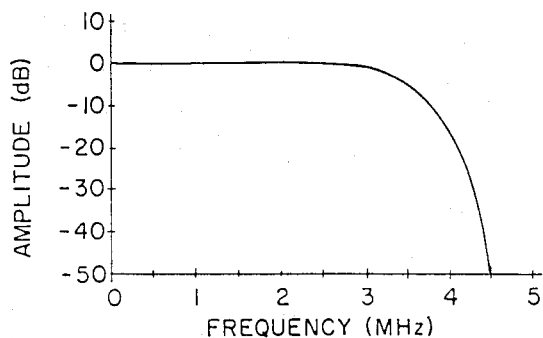
FIG. 3A is a graph showing a transmission gain vs. frequency characteristics in illustration of a propagation path of the television.
Figure 3B:
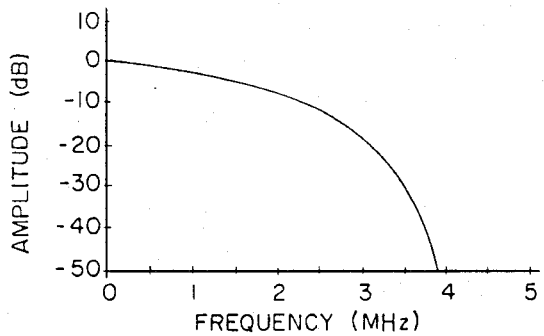
FIG. 3B is a graph showing amplitudes vs. frequency characteristics in illustration of a reference signal for canceling a ghost.
Figure 3C:
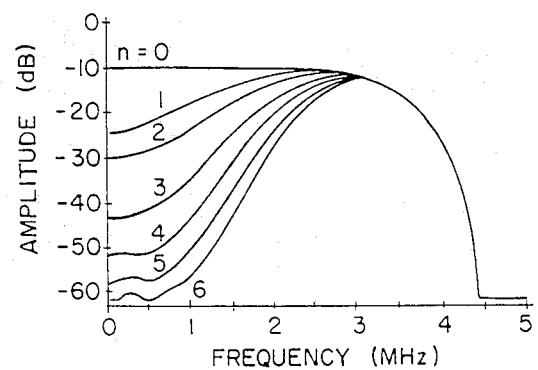
FIG. 3C is a graph showing an amplitude vs. frequency characteristics in illustration of a ghost component being canceled according to the prior art.

The transmission gain vs. frequency characteristics of the television is shown in FIG. 3A. However the differentiated vertical pulse is similar to the 2T pulse. The 2T pulse is the sine-squared pulse and its pulse width is equal to 0.25 μsec. The amplitude vs. frequency characteristics of the 2T pulse is shown in FIG. 3B. Supposing that: (a) the ghost has D/U rate of 10 dB and a phase of 0° or 180°; (b) the MSE algorithm is used; (c) α equals to 0.6, (d) and the reference signal is the 2T pulse, the difference of the rate of canceling the ghost in the frequency area is as shown in FIG. 3C. In FIG. 3C, the spectrum of the ghost is the same spectrum of the television signal (in FIG. 3A). From the equation (19) and FIG. 3B, as the frequency becomes higher, the amplitude of the reference signal becomes smaller, the converging speed of the equation (19) becomes slower, and the ghost becomes more difficult to be canceled.

From the above, the attenuations of the reference signal and of the error signal which are the input signals of the tap gain control means are modified so as to amplify in the frequency bands in which the ghost is required to be canceled, using the frequency transfer characteristic modification means 23 and 24, so that the capability of canceling ghost will be higher.

Figure 4:
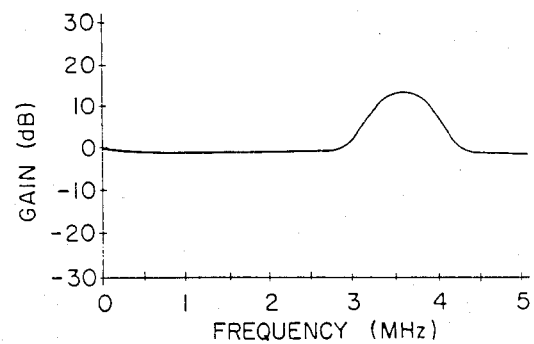
FIG. 4 is a graph showing a transmission gain vs. frequency characteristics of an example of a frequency transfer characteristics correction means used for the ghost canceling apparatus emboding the invention.

An example will be described below by referring to FIG. 4 which shows the transmission gain vs. frequency characteristics of the frequency transfer characteristic correction means 23 and 24. The color signal of the television is amplified about 15 dB, so that the color ghost can be remarkably canceled, using the MSE.

Now, watching the equation (2) and (3), by the ZF, the tap gain $c_{ZF}(j)$ is modified according to the error signal $e(n)$, and by the MSE, the tap gain $c_{MSE}(j)$ is modified according to the cross-correlation between the error signal $e(n)$ and the input signal $x(n)$. From the above, FIG. 2 is shown in block diagram of the ghost canceling apparatus of which the algorithm is the MSE.

Figure 5:
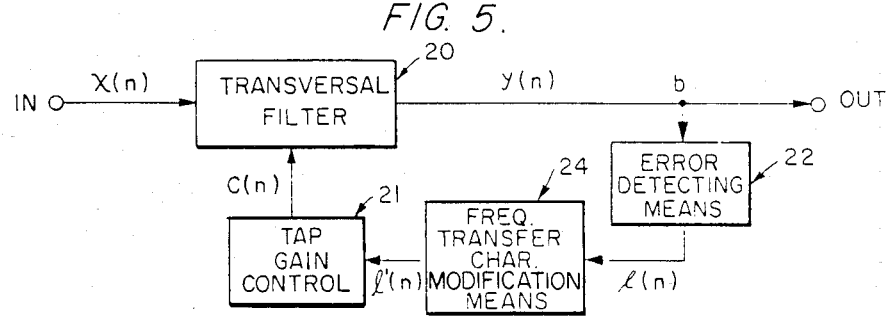
FIG. 5, FIG. 6, FIG. 7, FIG. 8, FIG. 9, FIG. 10, FIG. 11, FIG. 12 are block diagrams of ghost canceling apparatus embodying the present invention.

FIG. 5 is a block diagram of the ghost canceling apparatus of which the algorithm is the ZF, and in another preferred embodiment according to the present invention. In the embodiment FIG. 5, the frequency transfer characteristic modification means 24 and the path between the branch point (a) and the input terminal of the tap gain control means are removed from the embodiment in FIG. 2, because the ZF does not use the input signal $x(n)$.

Figure 6:
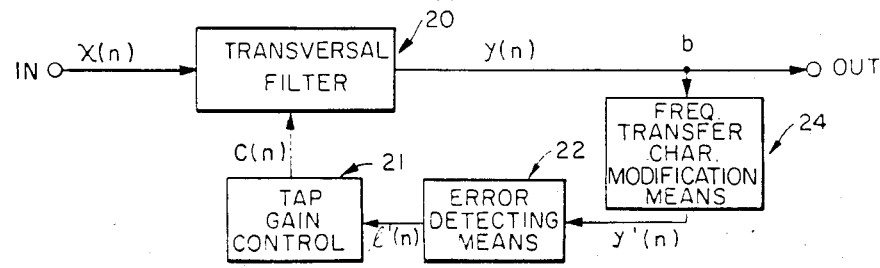

FIG. 6 is a block diagram of another preferred embodiment according to the present invention. In the embodiment in FIG. 6, the positions of the error detecting means 22 and of the frequency transfer characteristic modification means 24 can be exchanged in the embodiment in FIG. 5, for modifying the output signal $y(n)$. Since the error detecting means is a linear circuit, the frequency transfer modification means 24 can be either before or after the error detecting means 22.

Figure 7:
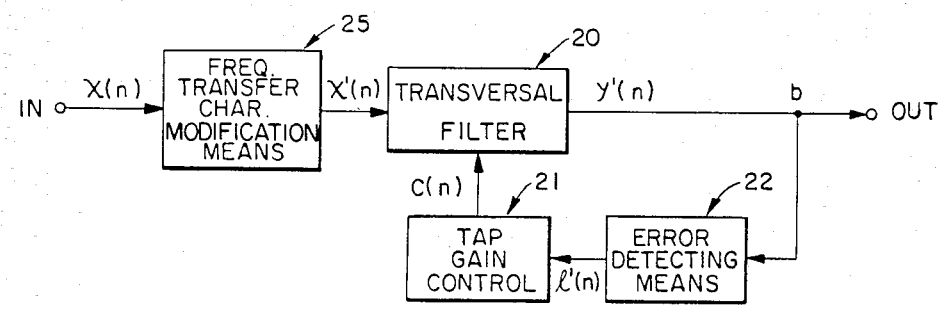

FIG. 7 is a block diagram of another preferred embodiment according to the present invention. In the embodiment in FIG. 7, the frequency transfer characteristic modification means 24 is removed from the embodiment in FIG. 5, and a further frequency transfer characteristic modification means 25 is connected between the input terminal to which the video signal is inputted and the input terminal of the transversal filter 20, for modifying the input signal $x(n)$.

Figure 8:
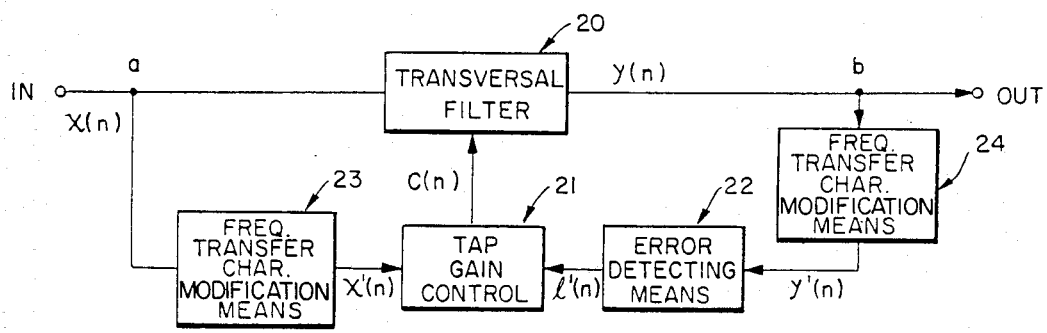

FIG. 8 is a block diagram of another preferred embodiment according to the present invention. In the embodiment in FIG. 8, the positions of the error detecting means 22 and of the frequency transfer characteristic modification means 24 can be mutually changed in the embodiment in FIG. 2, for modifying the output signal $y(n)$.

Figure 9:
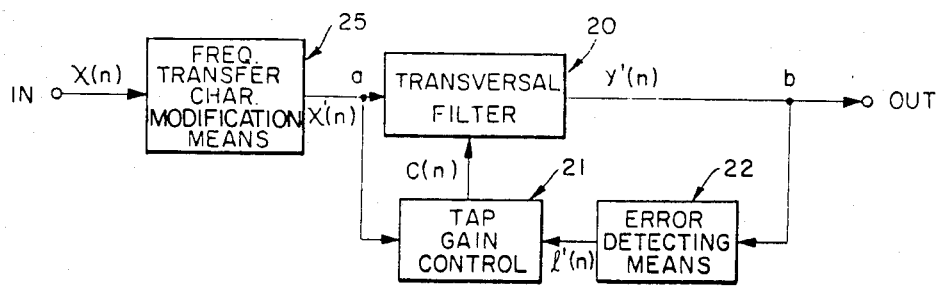

FIG. 9 is a block diagram of another preferred embodiment according to the present invention. In the embodiment in FIG. 9, the frequency transfer characteristic modification means 23 and 24 are removed from the embodiment in FIG. 2, and the other frequency transfer characteristic modification means 25 is connected between the input terminal to which the video signal is inputted and the branch point (a), for modifying the input signal $x(n)$.

Figure 10:
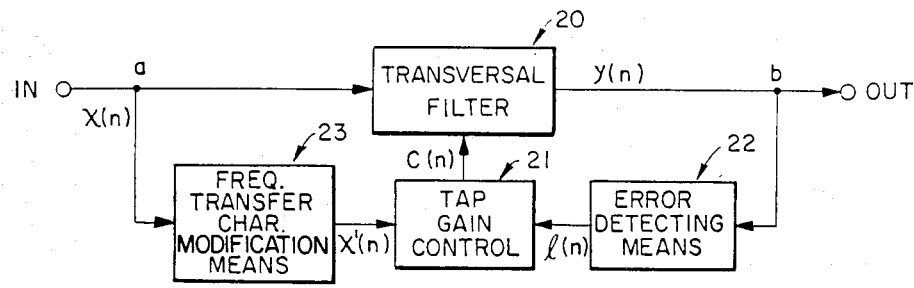

FIG. 10 is a block diagram of another preferred embodiment according to the present invention. In the embodiment in FIG. 10, the frequency transfer characteristic modification means 24 is removed from the embodiment in FIG. 2, for modifying the input signal $x(n)$ only. Since the tap gain $c_{MSE}(j)$ is modified according to the cross-correlation between the error signal $e(n)$ and the input signal $x(n)$ from the equation (3) by the MSE, the capability of canceling ghosts is higher by either signal being modified.

Figure 11:
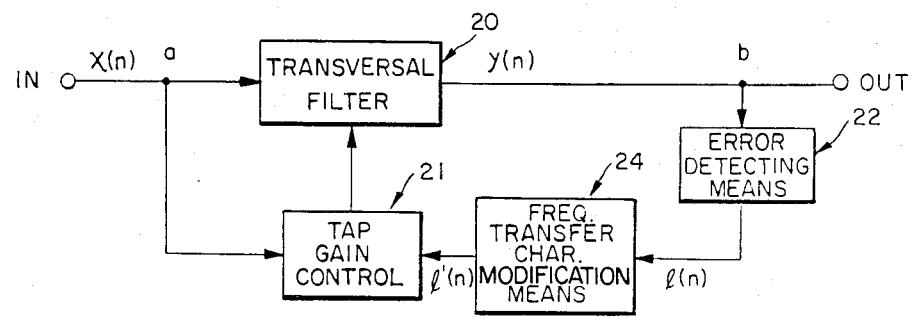

FIG. 11 is a block diagram of another preferred embodiment according to the present invention. In the embodiment in FIG. 11, the frequency transfer characteristic modification means 23 is removed from the embodiment in FIG. 2, for modifying the error signal $e(n)$ only.

Figure 12:
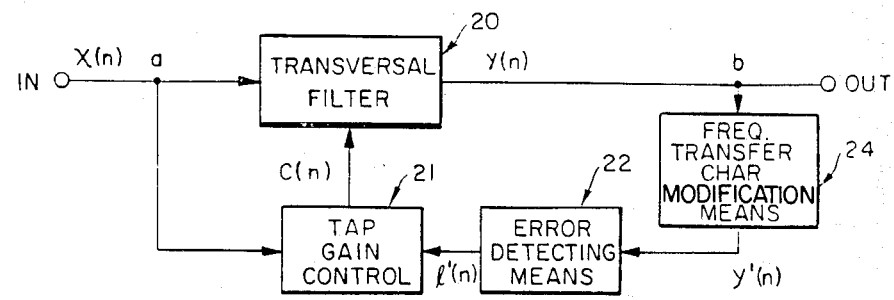

FIG. 12 is a block diagram in further preferred embodiment according to the present invention. In the embodiment in FIG. 12, the frequency transfer characteristic modification means 23 is removed, and the frequency transfer characteristic modification means 24 and the error detecting means 22 can be exchanged in the embodiment in FIG. 2, for modifying the output signal $y(n)$ only.

What is claimed is:

1. A ghost component signal canceling apparatus for canceling a ghost component in a video signal, said apparatus comprising (a) a ghost component signal transferring path which transfers a signal including a ghost component signal and comprises:

an input terminal to which a video signal is inputted;
a transversal filter operatively coupled at an input terminal thereof to said input terminal of said ghost component signal transferring path for canceling said ghost component signal;
an error detecting means operatively coupled at an input terminal thereof to an output terminal of said transversal filter for detecting a ghost component canceling error signal from said video signal; and
a tap gain control means operatively coupled at an input terminal thereof to an output terminal of said error detecting means for generating a tap gain control signal to said transversal filter from said ghost component canceling error signal, (b) a control signal path for supplying said control signal from said tap gain control means to a tap gain control terminal of said transversal filter, said transversal filter canceling a ghost component signal under the control of said tap gain control signal, and (c) an outputting path for supplying an output signal of said transversal filter to an output terminal of said ghost component signal canceling apparatus, wherein said ghost component signal canceling apparatus further comprises a frequency transfer characteristic modification means provided in said ghost component signal transferring path for amplifying a signal level at a specified frequency range of said signal which is transferred through said ghost component transferring path;
wherein said frequency transfer characteristic modification means is connected between said output terminal of said transversal filter and said input terminal of said error detecting means.

2. A ghost component signal canceling apparatus for canceling a ghost component in a video signal, said apparatus comprising (a) a ghost component signal transferring path which transfers a signal including a ghost component signal and comprises:

an input terminal to which a video signal is inputted;
a transversal filter operatively coupled at an input terminal thereof to said input terminal of said ghost component signal transferring path for canceling said ghost component signal;
an error detecting means operatively coupled at an input terminal thereof to an output terminal of said transversal filter for detecting a ghost component canceling error signal from said video signal; and a tap gain control means operatively coupled at an input terminal thereof to an output terminal of said error detecting means for generating a tap gain control signal to said transversal filter from said ghost component canceling error signal, (b) a control signal path for supplying said control signal from said tap gain control means to a tap gain control terminal of said transversal filter, said transversal filter canceling a ghost component signal under the control of said tap gain control signal, and (c) an outputting path for supplying an output signal of said transversal filter to an output terminal of said component signal canceling apparatus, wherein said ghost component signal canceling apparatus further comprises a frequency transfer characteristic modification means provided in said ghost component signal transferring path for amplifying a signal level at a specified frequency range of said signal which is transferred through said ghost component transferring path;

wherein said frequency transfer characteristic modification means is connected between said output terminal of said error detecting means and said input terminal of said tap gain control means.

3. A ghost component signal canceling apparatus for canceling a ghost component in a video signal, said apparatus comprising (a) a ghost component signal transferring path which transfers a signal including a ghost component signal and comprises:

an input terminal to which a video signal is inputted;

a transversal filter operatively coupled at an input terminal thereof to said input terminal of said ghost component signal transferring path for canceling said ghost component signal;

an error detecting means operatively coupled at an input terminal thereof to an output terminal of said transversal filter for detecting a ghost component canceling error signal from said video signal; and a tap gain control means operatively coupled at an input terminal thereof to an output terminal of said error detecting means for generating a tap gain control signal to said transversal filter from said ghost component canceling error signal, (b) a control signal path for supplying said control signal from said tap gain control means to a tap gain control terminal of said transversal filter, said transversal filter canceling a ghost component signal under the control of said tap gain control signal, and (c) an outputting path for supplying an output signal of said transversal filter to an output terminal of said ghost component signal canceling apparatus, wherein said ghost component signal canceling apparatus further comprises a frequency transfer characteristic modification means provided in said ghost component signal transferring path for modifying said signal which is transferred through said ghost component transferring path;

wherein said ghost component signal transferring path further comprises an input path branch for feeding the input video signal to a further input terminal of said tap gain control means for generating said tap gain control signal from both said input video signal and said ghost component canceling error signal; and wherein said frequency transfer characteristic modification means is connected between said input path branch and said further input terminal of said tap gain control means.

4. A ghost component signal canceling apparatus according to claim 3, wherein a further frequency transfer characteristic modification means is connected between said output terminal of said transversal filter and said input terminal of said error detecting means.

5. A ghost component signal canceling apparatus according to claim 3, wherein a further frequency transfer characteristic modification means is connected between said output terminal of said error detecting means and said input terminal of said tap gain control means.

6. A ghost component signal canceling apparatus for canceling a ghost component in a video signal, said apparatus comprising (a) a ghost component signal transferring path which transfers a signal including a ghost component signal and comprises:

an input terminal to which a video signal is inputted;

a transversal filter operatively coupled at an input terminal thereof to said input terminal of said ghost component signal transferring path for canceling said ghost component signal;

an error detecting means operatively coupled at an input terminal thereof to an output terminal of said transversal filter for detecting a ghost component canceling error signal from said video signal; and a tap gain control means operatively coupled at an input terminal thereof to an output terminal of said error detecting means for generating a tap gain control signal to said transversal filter from said ghost component canceling error signal, (b) a control signal path for supplying said control signal from said tap gain control means to a tap gain control terminal of said transversal filter, said transversal filter canceling a ghost component signal under the control of said tap gain control signal, and (c) an outputting path for supplying an output signal of said transversal filter to an output terminal of said ghost component signal canceling apparatus, wherein said ghost component signal canceling apparatus further comprises a frequency transfer characteristic modification means provided in said ghost component signal transferring path for modifying said signal which is transferred through said ghost component transferring path;

wherein said ghost component signal transferring path further comprises an input path branch for feeding the input video signal to a further input terminal of said tap gain control means for generating said tap gain control signal from both said input video signal and said ghost component canceling error signal; and wherein said frequency transfer characteristic modification means is connected between said output terminal of said transversal filter and said input terminal of said error detecting means.

7. A ghost component signal canceling apparatus for canceling a ghost component in a video signal, said apparatus comprising (a) a ghost component signal transferring path which transfers a signal including a ghost component signal and comprises:

an input terminal to which a video signal is inputted;

a transversal filter operatively coupled at an input terminal thereof to said input terminal of said ghost component signal transferring path for canceling said ghost component signal;

an error detecting means operatively coupled at an input terminal thereof to an output terminal of said transversal filter for detecting a ghost component canceling error signal from said video signal; and a tap gain control means operatively coupled at an input terminal thereof to an output terminal of said error detecting means for generating a tap gain control signal to said transversal filter from said ghost component canceling error signal, (b) a control signal path for supplying said control signal from said tap gain control means to a tap gain control terminal of said transversal filter, said transversal filter canceling a ghost component signal under the control of said tap gain control signal, and (c) an outputting path for supplying an output signal of said transversal filter to an output terminal of said ghost component signal canceling apparatus, wherein said ghost component signal canceling apparatus further comprises a frequency transfer characteristic modification means provided in said ghost component signal transferring path for modifying said signal which is transferred through said ghost component transferring path;

wherein said ghost component signal transferring path further comprises an input path branch for feeding the input video signal to a further input terminal of said tap gain control means for generating said tap gain control signal from both said input video signal and said ghost component canceling error signal; and wherein said frequency transfer characteristic modification means is connected between said output terminal of said error detecting means and said input terminal of said tap gain control means.

* * * * *